(12) United States Patent
Bureau et al.

(10) Patent No.: US 11,407,533 B2
(45) Date of Patent: Aug. 9, 2022

(54) ENHANCED MONITORING METHOD IN A DRUG CONTAINERS HANDLING LINE AND DRUG CONTAINERS HANDLING LINE THEREOF

(71) Applicant: NUOVA OMPI S.R.L., Padua (IT)

(72) Inventors: Christophe Bureau, Padua (IT); Tod Urquhart, Padua (IT); Pierre-Emmanuel Leteurtre, Padua (IT)

(73) Assignee: NUOVA OMPI S.R.L., Padua (IT)

( * ) Notice: Subject to any disclaimer, the term of this patent is extended or adjusted under 35 U.S.C. 154(b) by 145 days.

(21) Appl. No.: 16/624,134

(22) PCT Filed: Jun. 19, 2018

(86) PCT No.: PCT/IB2018/054507
§ 371 (c)(1),
(2) Date: Dec. 18, 2019

(87) PCT Pub. No.: WO2018/234993
PCT Pub. Date: Dec. 27, 2018

(65) Prior Publication Data
US 2020/0130948 A1    Apr. 30, 2020

(30) Foreign Application Priority Data
Jun. 20, 2017   (IT) .................. 102017000068513

(51) Int. Cl.
*B65B 3/00*       (2006.01)
*A61J 1/00*       (2006.01)
(Continued)

(52) U.S. Cl.
CPC .............. *B65B 3/003* (2013.01); *A61J 1/00* (2013.01); *B65C 9/46* (2013.01); *B65G 43/10* (2013.01);
(Continued)

(58) Field of Classification Search
CPC ..................................................... B65B 3/003
See application file for complete search history.

(56) References Cited

U.S. PATENT DOCUMENTS 7,636,044 B1    12/2009  Callaghan
8,328,082 B1 *  12/2012  Bochenko .............. G16H 10/40
                                                     235/462.15
(Continued)

FOREIGN PATENT DOCUMENTS

JP    S61-30366 A     2/1986
JP    H06-246518 A    9/1994
(Continued)

OTHER PUBLICATIONS

International Search Report and Written Opinion of the International Searching Authority for International Patent Application No. PCT/IB2018/054507 dated Sep. 26, 2018, 13 pages.
(Continued)

*Primary Examiner* — Thomas Randazzo
(74) *Attorney, Agent, or Firm* — Merchant & Gould P.C.

(57) ABSTRACT

A method for reconciliation in a drug filling line includes providing a batch number relating to a predetermined batch of containers to be filled with a drug. Each one of the containers is marked with a unique identifier differentiating and/or identifying each container among others. Each unique identifier is stored and associated with the batch number by a processing and control unit, before starting the filling step of each container. Filled containers are flashed by at least one identifier reader to check correspondence between the batch number being processed and each filled container, in order to validate or reject in real time each container with respect to a predetermined batch being processed by the filling line.

22 Claims, 2 Drawing Sheets

(51) Int. Cl.
  *G05B 19/418*   (2006.01)
  *B65C 9/46*   (2006.01)
  *B65B 57/00*   (2006.01)
  *B65G 43/10*   (2006.01)
  *B65G 47/26*   (2006.01)

(52) U.S. Cl.
  CPC ......... *B65G 47/26* (2013.01); *G05B 19/4183* (2013.01); *G05B 19/4189* (2013.01); *A61J 2205/10* (2013.01); *A61J 2205/60* (2013.01); *B65G 2203/0216* (2013.01); *G05B 2219/31432* (2013.01)

(56) References Cited

U.S. PATENT DOCUMENTS

| | | | | |
|---|---|---|---|---|
| 9,033,006 | B2* | 5/2015 | Perazzo | B65B 7/28 |
| | | | | 141/319 |
| 2004/0123567 | A1* | 7/2004 | McErlean | B65C 9/0015 |
| | | | | 53/445 |
| 2008/0121537 | A1* | 5/2008 | Sankaran | B65B 43/123 |
| | | | | 206/223 |
| 2012/0153031 | A1* | 6/2012 | Rupp | B01L 3/5457 |
| | | | | 235/494 |
| 2014/0330429 | A1* | 11/2014 | Collombet | G06Q 50/28 |
| | | | | 700/226 |
| 2014/0373969 | A1* | 12/2014 | Goldman | B67C 3/023 |
| | | | | 141/9 |
| 2016/0110519 | A1* | 4/2016 | Louie | G06Q 10/087 |
| | | | | 705/2 |
| 2018/0025185 | A1* | 1/2018 | Hattrup | G06K 15/024 |
| | | | | 705/14.1 |

FOREIGN PATENT DOCUMENTS

| | | |
|---|---|---|
| JP | 2005-257493 A | 9/2005 |
| JP | 2007-011658 A | 1/2007 |
| JP | 2007-260295 A | 10/2007 |
| JP | 2013-156105 A | 8/2013 |
| WO | 01/63368 A2 | 8/2001 |
| WO | 03/038738 A1 | 5/2003 |
| WO | 2011/108225 A1 | 9/2011 |
| WO | 2013/079409 A1 | 6/2013 |
| WO | 2013/111329 A1 | 8/2013 |

OTHER PUBLICATIONS

Japanese Office Action for Japanese Patent Application No. 2019-569241 dated Sep. 28, 2021.

* cited by examiner

ENHANCED MONITORING METHOD IN A DRUG CONTAINERS HANDLING LINE AND DRUG CONTAINERS HANDLING LINE THEREOF

This application is a National Stage Application of PCT/IB2018/054507, filed 19 Jun. 2018, which claims the benefit of Serial No. 102017000068513, filed 20 Jun. 2017 in Italy, and which applications are incorporated herein by reference. To the extent appropriate, a claim of priority is made to each of the above-disclosed applications.

TECHNICAL FIELD

The present invention relates to an enhanced monitoring method in a drug containers handling line and a drug containers handling line thereof.

BACKGROUND ART

In particular, safety of patients taking medicines is a non negotiable aspect of the pharma industry today.

When the safety of some drugs is under concern, in relation e.g. to quality issues of the manufactured products, pharma companies make recalls of part of their products.

Recalls of products are usually selective, corresponding to a given period of manufacturing during which a quality issue has been identified a posteriori.

One nightmare of the pharma industry is to recall only part of the problem=to leave in the market drugs that may still cause adverse effects.

Recalls are made by lot numbers, i.e. in reference to the packaging numbers, because they are the objects facing the end user (the person who is taking the drug).

Inside these packagings, there is a drug formulation, which comes from a given*batch*=a large volume of stock (powder or solution) drug, that is fragmented and dispensed or assembled in pill or container format to be used by the patient.

In order to eliminate the possibility for an incomplete recall, pharma companies are imposing a one to one correspondence between batch numbers and lot numbers. Imagine a batch of 10.000 litres of flu vaccine, to be filled in 1 mL format in glass containers: this corresponds to 10 million doses. With lots having a size of ca. 1 million containers, 10 lots will be needed for this single batch. With test samples, rejects . . . etc, a fraction of an 11th lot may be needed: the remainder of this lot cannot be used for another batch.

The rationale of this is that when two batches of said flu vaccine are manufactured, they are never totally identical. Many parameters, part of their QC, are checked, and 2 batches are "the same" when they do not differ by more than a certain range, fixed usually by the "6 sigma" rule, i.e. all checked parameters (pH, particles, viscosity . . . etc) are all equal+/−a given % so that the gaussian distribution of the manufactured products is narrow enough to have up to 6 times the width at mid height of the distribution within the tolerance window.

Making a drug is a very complex process, with many parameters, and there is always the possibility that a critical parameter has not been identified, despite all studies that were run. Let's examine for example that for some reason, a drug may have a non desired side effects when taken by red hair people who have been vaccinated by a H3N2 strain of flu and having diabetes, it is impossible to detect this if there were never any such person in the criteria of the clinical trial over which the safety tests of the drug were performed (the above example is chosen because it is probably very rare . . . . It is purely illustrative).

The fact that containers of a lot number are being used in two different batches is called "mixup", and must be totally eliminated in order to enable the containment, by recall, of any improbable issue that may arise despite the proper conduct of quality controls.

An even bigger issue is the case of intruder containers: in filling lines, containers are travelling on tapis roulant, rotating tables or star shaped wheels and the like, at high speed. It is not rare to have some of them trapped in a zone of the line, and remain there "for ever". The issue they represent is that once the filling of the 10+ lots is finished, pharma operators must know whether some containers of these 10+ lots are stocked in the line, otherwise they may suddenly be freed during the filling from a subsequent batch in the same filling line, and mixup takes place.

In order to minimise this, mixup is controlled by counting how many containers exit filled from the line, and compare this number with the number of incoming containers, minus the rejects minus the samples extracted by the operator. Regulation imposes that these two numbers are equal+/−0.5%.

It is surprising to see that regulation does not impose a strict equality between the two numbers, but this translates the mere reality that some containers can be stocked in the line and this do not re-appear in the end.

This number seems small, but with the above example, 0.5% of 10 million doses is 50.000 doses, i.e. potentially 50.000 patients can be impacted by a product issue, without any possibility to control or improve the existing processes.

This is a huge technical problem that does not have a definitive solution today.

As long as the counting remains within this 0.5% window, the line is considered to work "normally".

Whenever the counting is above the acceptance window, operators interrupt the line and implement a procedure, involving manual check in each machine of the whole line, meant to identify the presence of containers that are stuck and establish whether the presence of these containers can explain the deviation on the reconciliation. This happens in 0.5% of cases on average.

In 2.5% of these 0.5% of cases, this inspection is not conclusive, and the full batch is discarded, i.e. the 10 million doses . . . .

On average, it is estimated that the downtime of these inspections, although rare (0.5%) are accounting for a loss of 3 to 6% in manufacturing capacity, which is enormous.

For drugs for which this missed manufacturing capacity can be translated in missed sales (i.e. drugs which are in under capacity), this can correspond to losses of $50 to $150M per line per year. This is probably very true for insulin and vaccines, may be less true for biotech drugs.

Ahead of the mixup issue, this problem is hindering the technical possibility to fulfil global needs, in particular for vaccines and insulin.

There is a need to solve this issue of reconciliation in order to avoid both problems.

SUMMARY OF THE INVENTION

The purpose of the present invention is that of providing a solution which overcomes the drawbacks mentioned with reference to the prior art.

BRIEF DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1:
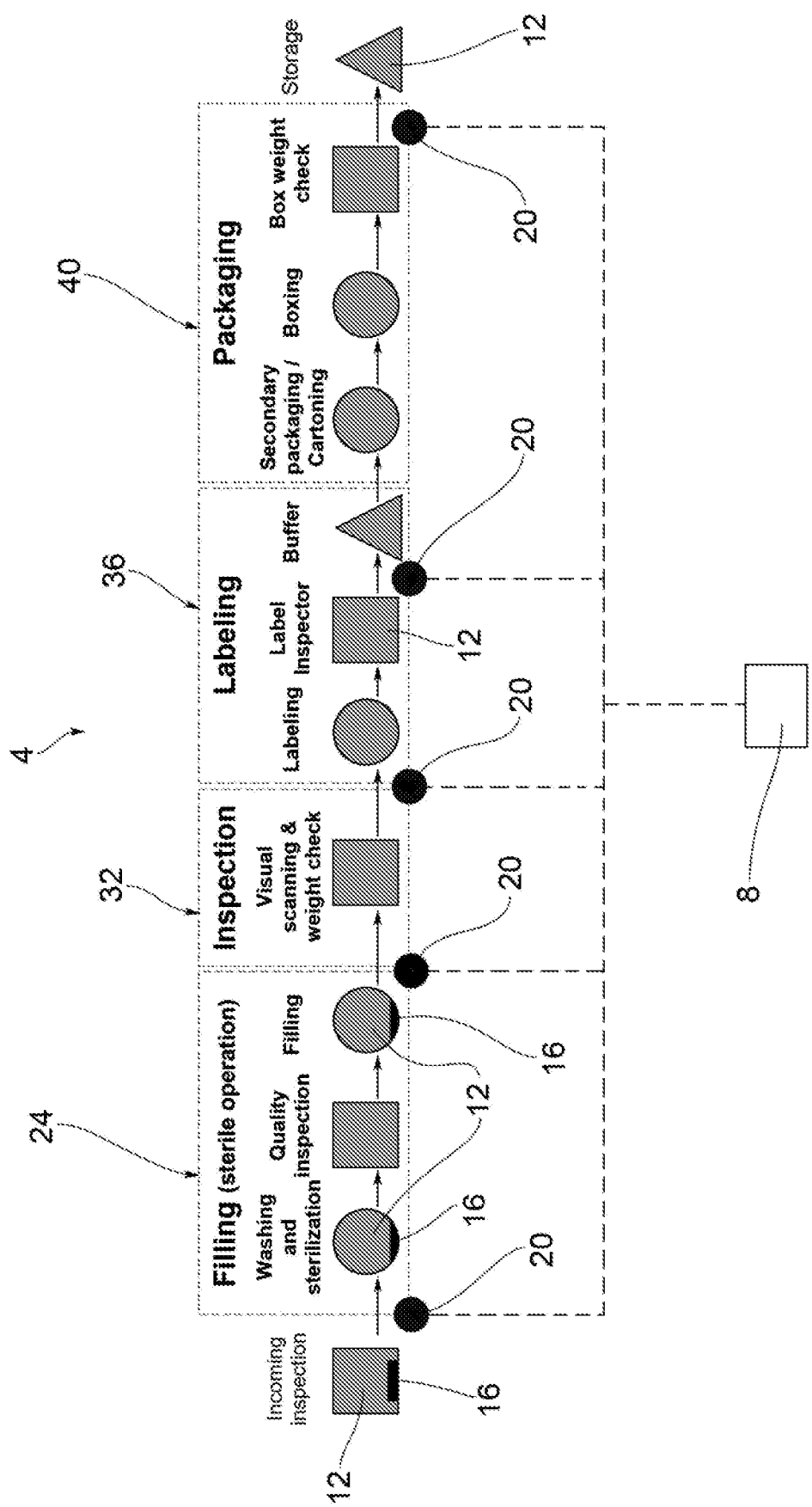
FIG. 1 shows a sketch view of a drug containers handling line according to an embodiment of the present invention.
Figure 2:
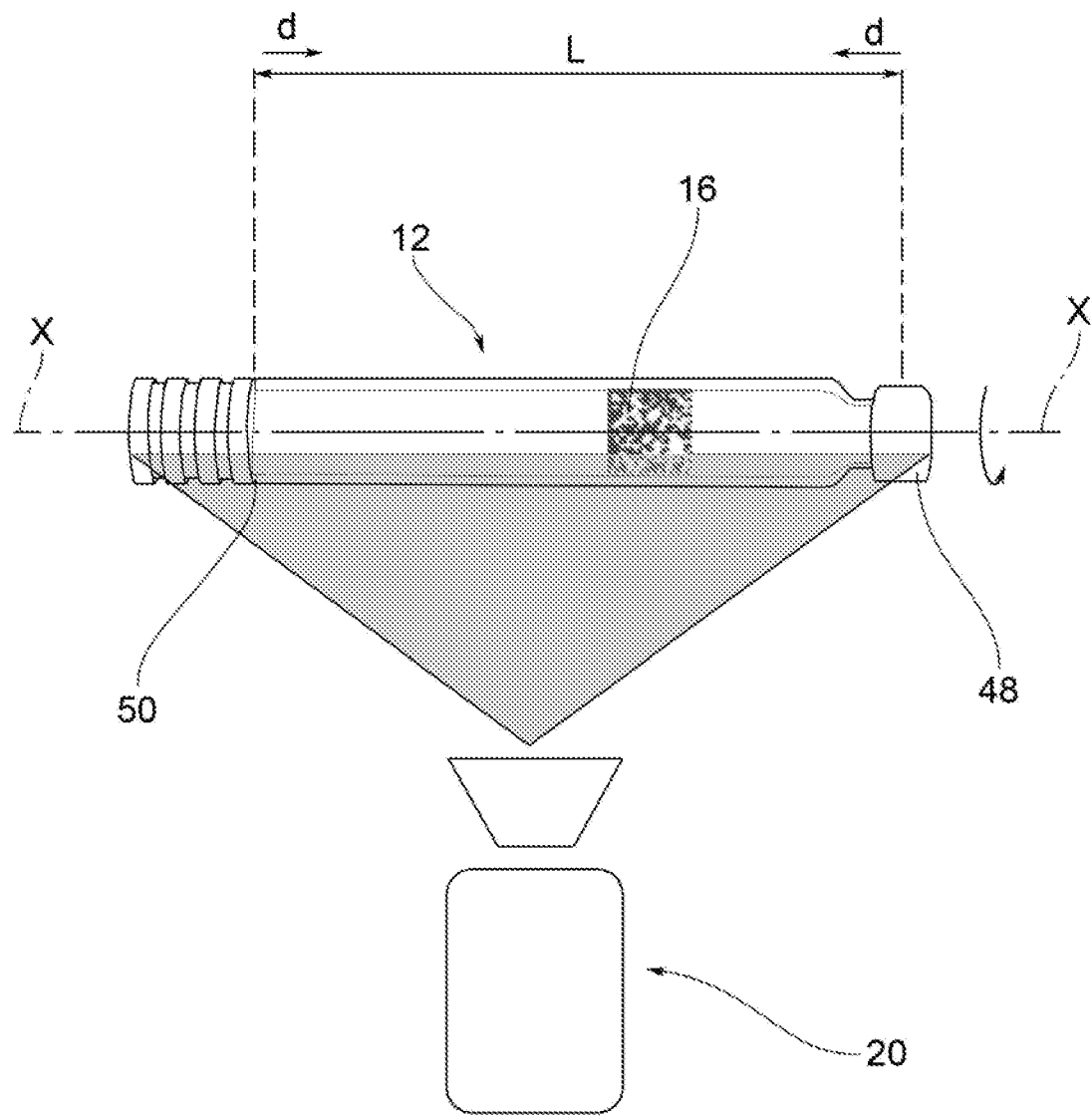
FIG. 2 shows a sketch view of a identifier reader and a container provided with an identifier.

With reference to the aforementioned figures, reference numeral 4 globally denotes a drug containers handling line.

The drug containers handling line comprises a processing and control unit 8 storing a batch number relating to a predetermined batch of containers 12 to be handled, for example: filled/loaded with a drug, inspected, labelled and packaged.

The current invention is not related to a specific type of drug and/or container.

Therefore the kind of drug, the size and/or material of the containers can be of different types and do not affect or limit the scope of protection of the invention.

The drug may be both liquid and solid, like pills or power.

The drug containers handling line 4 comprises at least one identifier 16, unique for reach container 12, applied to each container 12.

The identifier can be of any type: for example, it can be a tag, a RFID, a 1D barcode, a 2D barcode, a QR code and so on. Moreover, the identifier can be applied to the container 12 by means of a support like an adhesive label, it can printed on the surface of the container 12 via projection of ink or with laser 'tattooing', or engraving the surface mechanically, thermally or via a laser, selectively changing refractive index within the bulk material the container is made of with a laser, or embedding said unique identifier 16 within the material the container is made of.

Anyway it is applied to the container 12, preferably to the external of the container 12, so as to be flashed easily by an identifier reader 20.

Each identifier 16 is stored and associated to a unique container 12 in said processing and control unit 8; in other words, each identifier 16 is uniquely associated to a single container 12, and the association and correspondence thereof is performed and stored in said processing and control unit 8.

At least one identifier reader 20 is placed along the handling line 4 downstream a filling station 24 of the containers 12. Therefore such identifier reader 20 reads the identifier 16 of each filled container.

An identifier reader 20 can be, typically but not exclusively, a camera able to scan, read and identify the identifier itself.

In this way, it is possible to individuate a negative correspondence of a container 12, empty or filled with drug, and to discard it.

To this end, the drug containers handling line comprises selecting means (not shown) able to discard, reject and/or block a container 12 in case of negative correspondence between its identifier 16 and the batch number relating to the batch being processed in the handling line 4.

For example said selective means may comprise pushing arms, jaws, traps and so on.

According to a possible embodiment, at least one identifier reader 20 is placed upstream the filling station 24 of the containers 12, in order to check the identifier correspondence of empty containers 12 before being filled with drug.

In this way it is possible to discard/block a container along the line before it is filled with drug.

Preferably, the handling line 4 comprises at least two spaced apart identifier readers 20, along different stations of the handling line, able to read the identifiers 16 placed on each container 12, wherein said identifier readers 20 are operatively connected with said processing and control unit 8.

In this way, it is possible to check the position and the timing of each container 12 along the handling line 4, in real time.

For example, after the filling station 24 an inspection station 32 may be provided so as to perform a visual scanning and weight check of the filled container 12.

Preferably at least one identifier reader 20 is positioned in correspondence of said inspection station 32.

For example after the inspection station 32 a labelling station 36 may be provided, in order to apply a label on each container 12.

Preferably, at least one identifier reader 20 is positioned in correspondence of said labelling station 36.

According to an embodiment, after the labelling station 36, a packaging station 40 is provided in order to pack each container 12 and finally weight each box containing a container 12.

Preferably, at least one identifier reader 20 is positioned in correspondence of said packaging station 40.

According to another embodiment of the present invention, it is possible to provide a handling line having an inspection line separated from the filling line; therefore the inspection line can comprise an inspection station 32 only, with no filling station 24.

In this embodiment, it is possible to perform the reconciliation process to a drug containers inspection line only.

The method for reconciliation in a drug containers handling line according to the present invention will be described in the following.

In particular, the method for reconciliation in a drug containers handling line 4 comprises the steps of:

providing a batch number relating to a predetermined batch of containers 12 to be filled with a drug, marking each one of said containers 12 with a unique identifier 16 differentiating and/or identifying each container 12 among others, storing and associating each unique identifier 16 with said batch number by means of a processing and control unit 8, before starting the filling step of each container 12, flashing containers 12 by at least one identifier reader 20 so as to check the correspondence between the batch number being processed and each filled container 12, in order to perform reconciliation, by validating or rejecting in real time each container with respect to a predetermined batch being processed by the filling line 4.

In case of negative check/validation of the correspondence between the batch number and a filled container 12, said filled container 12 is removed from or spaced apart the filling line 4.

Preferably, each negative check is communicated, in real time, to the processing and control unit 8.

Preferably, the steps of flashing filled containers 12 by at least one identifier reader 20, validating or rejecting a container 12 are performed in real time and communicated to the processing and control unit 8, without interrupting the filling line 4.

As already explained, above reconciliation method can be applied also to a drug containers inspection line; in other words the inspection can be performed on filled containers and the reconciliation method can be performed on the filled containers to check the correspondence between the batch number being processed and each filled container, in order to validate or reject in real time each container with respect to a predetermined batch being processed by the inspection line.

Preferably, the step of flashing/scanning filled containers 12 by at least one identifier reader 20 comprises the steps of:
rotating each container 12, around a main axis X-X, while scanning/flashing it,
flashing/scanning each container 12 while rotating it around said main axis X-X of at least 360 degrees.

Preferably, the flashing is performed by a scanning/flashing device or identifier reader 20 scanning an area of the container 12 spaced apart a top 48 or a bottom 50 of the container 12 by a distance 'd' of at least one quarter of the overall length 'L' of the container itself, said distance 'd' and length 'L' being measured along a direction parallel to the main axis X-X.

According to a possible embodiment, the steps of flashing filled containers 12 by at least one identifier reader 20, validating or rejecting a container 12 are performed in at least two different, spaced apart, spots or stations along the filling line so that intruder containers 12 can immediately be identified when they appear, and the spots/stations were containers got stuck can be spotted right away.

Preferably the method comprises the steps of mapping the position and the timing of each container 12 along the filling line, in correspondence of at least two flashing spots/stations.

In this way it is possible to follow and check the position of each container 12 through the line.

According to a possible embodiment, the method comprises the step of flashing containers 12 by at least one identifier reader 20, before said containers 12 are filled with a drug, so as to check the correspondence between the batch number being processed and each empty container 12, in order to validate or reject in real time each container 12 with respect to a predetermined batch being processed by the filling line. In this way it is possible to avoid that an intruder container can be filled with drug; in fact the intruder container 12 will be discarded and/or blocked before reaching the filling station 24.

At the same time the check of the identifier correspondence on a filled container 12 is important to check and definitively avoid an intruder container filled with drug: in this way there is no possibility that a wrong container 12 filled with drug can pass the filling station.

As it can be inferred from the description, the method and apparatus according to the invention overcome the drawbacks mentioned with reference to the cited prior art.

In fact the logic of the process has been changed from counting admission (like in prior art solutions) to selective admission, via automated real-time reconciliation.

In the solution according to the invention, containers are uniquely marked by some form of an identifier (RFID, 1D or 2D barcode) that can help them be uniquely identified.

Batches have a batch number, expiry date and other relevant product related data—as well as the higher level packagings hosting the containers which enter the filling line.

Before the filling starts, the link is done on a processing and control unit between the batch number and the various lot numbers which are going to be used. Thanks to the fact that the lots aggregate themselves the reference numbers of the packagings hosting the containers, as well as the unique identifiers of the single containers, we know before the filling starts which containers are "eligible" to be filled by this batch number.

As the filling proceeds, filled containers are being flashed after the filling step and check is made that they are entitled to be filled with this batch.

Let's now reconsider the above catastrophic situation explained in the introduction of the patent application: a container remains stuck in some part of a filling line, and is freed at a later stage while another batch is being processed. In that case, when the container passes the identifier reader after the filling, it is identified as an intruder since his code number is not part of the new aggregated lot numbers for this new batch.

Therefore, the container can be picked out from the line, and will never pass onto the final packaging shipped to the pharmacies=it will never reach a patient.

The logic is not based on counting anymore and inspection in suspicious cases, but exclusively on exit criteria: the logic is totally changed, to deliver a zero error control.

Therefore the risk of a "mixup" between two different batches processed in the same filling line is totally eliminated.

In addition to this, this control can be done in real time, and thus does not require any interruption of a line aside of planned maintenance. This solves the second issue above by giving back 3 to 6% OEE (overall equipment effectiveness) to the operators, i.e. more capacity without a need for investment.

Optionally, more identifier readers can be installed at different spots of the filling line so that intruder containers can immediately be identified when they appear, and the spots were containers get stuck can be spotted right away.

Still optionally, such a mapping of which container is where and when can enable the operator to identify strictly which containers may be concerned by an interruption of a line for whatever reason other than reconciliation, and remove from the line strictly those containers for which this interruption may have an impact (e.g. containers which spend a time longer than expected in an oven).

While specific embodiments of the invention have been disclosed, it is to be understood that such disclosure has been merely for the purpose of illustration and that the method and the filling line is not to be limited in any manner thereby. Various modifications as to the shape and location of parts, and constructional and functional details will be apparent to those skilled in the art in view of the foregoing examples.

The invention claimed is:

1. A monitoring method in a drug container handling line comprising the steps of:
providing a predetermined batch of containers to be handled along a handling line;
providing a batch number relating to the predetermined batch of containers to be handled;
providing each one of said containers with a first unique identifier differentiating and/or identifying each container;

storing and associating each unique identifier with said batch number by a processing and control unit, before starting a handling step of each container;

checking a first weight and scanning one or more of said containers by at least one identifier reader at an inspection station to check correspondence between the batch number being processed and each container to validate or reject in real time each container with respect to a predetermined batch being processed by the drug container handling line;

labeling one or more of said containers by applying a second unique identifier differentiating and/or identifying each container, wherein the second unique identifier is inspected by at least one identifier reader;

packaging each of said containers at a packaging station;

checking a second weight of each of said packaging containers to verify the contents and final weight of each of said packaging containers; and placing each of the verified packaging containers into a storage.

2. The monitoring method in a drug container handling line according to claim 1, wherein, in case of negative check of the correspondence between the batch number and a container, said container is removed from or spaced apart from the drug container handling line.

3. The monitoring method in a drug container handling line according to claim 1, wherein each negative check is communicated, in real time, to the processing and control unit.

4. The monitoring method in a drug container handling line according to claim 1, wherein the steps of scanning containers by at least one identifier reader, validating or rejecting a container are performed in at least two different, spaced apart, spots/stations along the handling line so that intruder containers can immediately be identified when the intruder containers appear, and the spots/stations where containers get stuck are spotted immediately.

5. The monitoring method in a drug container handling line according to claim 1, wherein the steps of scanning containers by at least one identifier reader, validating or rejecting a container are performed in real time and communicated to the processing and control unit, without interrupting the drug handling line.

6. The monitoring method in a drug container handling line according to claim 1, comprising the step of mapping position and the timing of each container along the drug handling line, in correspondence of at least two scanning spots/stations.

7. The monitoring method in a drug container handling line according to claim 1, wherein each unique identifier comprises data relating each container and the drug to be contained therein.

8. The monitoring method in a drug container handling line according to claim 1, wherein said drug container handling line is a drug inspection line, wherein said containers are filled with a drug after being provided with a unique identifier.

9. The method according to claim 1, further comprising the step of embedding the identifier within a wall of a container.

10. The monitoring method according to claim 1, wherein the scanning is performed on all of the containers.

11. The method according to claim 1, wherein the step of scanning containers by at least one identifier reader further comprises the steps of:

rotating each container, around a main axis, while scanning each container;

scanning each container while rotating each container around said main axis by at least 360 degrees.

12. The method according to claim 11, wherein the scanning is performed by a scanning device scanning an area of the container spaced apart a top or a bottom of the container by a distance of at least one quarter of an overall length of the container, said distance and length being measured along a direction parallel to the main axis.

13. A drug handling line comprising:

a processing and control unit, wherein the processing and control unit stores a batch number relating to a predetermined batch of containers to be handled by the handling line;

at least one identifier, wherein the at least one identifier is unique for each container and applied to each container, each identifier being stored and associated to a unique container in said processing and control unit;

at least one identifier reader placed along the handling line, wherein the at least one identifier reader is configured to read the identifier of each container, wherein the at least one identifier reader is positionable at a plurality of locations within the drug handling line; and a selector configured to perform one of the actions from a group consisting of discarding, rejecting, or blocking a container in case of negative correspondence between the at least one identifier and the batch number relating to the batch being processed in the handling line, wherein the selector is located upstream of a filling station; and a plurality of processing stations, wherein the plurality of processing stations are configured to sterilize and inspect each container by visually scanning each container.

14. The drug handling line according to claim 13, comprising an inspection line having an inspection station.

15. The drug handling line according to claim 13, comprising at least one drug filling station to fill said containers with drug, wherein at least one identifier reader is placed upstream the filling station of the containers, in order to check identifier correspondence of empty containers before being filled with drug.

16. The drug handling line according to claim 13, comprising at least two spaced apart identifier readers, along different stations of the filling line, able to read the identifiers placed on each container, wherein said identifier readers are operatively connected with said processing and control unit.

17. The drug handling line according to claim 13, wherein the at least one identifier reader is positionable downstream of the selector and upstream of the filling station.

18. The drug handling line according to claim 13, further comprising an inspection station downstream of the filling station, a labeling station downstream of the inspection station, and a packaging station downstream of the labeling station, wherein the at least one identifier reader is positionable upstream of the inspection station and downstream of the filling station, wherein the at least one identifier reader is positionable upstream of the labeling station and downstream of the inspection station, wherein the at least one identifier reader is positionable downstream of the packaging station.

19. A method for reconciliation in a drug inspection line comprising the step of:

providing a predetermined batch of containers to be handled along a handling line;

providing a batch number relating to the predetermined batch of containers to be handled;

providing each one of said containers with a unique identifier differentiating and/or identifying each container;

sterilizing each of said containers and filling each of said sterilized containers with a drug, at a filling station within the handling line, after each of said sterilized containers is provided with a unique identifier;

storing and associating each unique identifier with said batch number by a processing and control unit, before starting a handling step of each container; and scanning and weighing one or more filled sterilized containers with at least one identifier reader at an inspection station, so as to check the correspondence between the batch number being processed and filled container, in order to perform reconciliation, by validating or rejecting in real time each container with respect to a predetermined batch being processed by the drug inspection line.

20. The method according to claim 19, wherein the scanning is performed on all of the containers.

21. A method for reconciliation in a drug filling line comprising the step of:

providing a batch number relating to a predetermined batch of containers to be handled;

providing each one of said containers with a unique identifier differentiating and/or identifying each container;

sterilizing each of said containers and filling each of said sterilized containers with a drug, at a filling station within the drug filling line, after each of said sterilized containers is provided with a unique identifier;

storing and associating each unique identifier with said batch number by a processing and control unit, before starting a handling step of each sterilized container; and scanning each of said sterilized containers by using at least one identifier reader, before each of said sterilized containers are filled with a drug, to reconcile the batch number being processed and the unique identifier of each empty sterilized container by validating or rejecting in real time each sterilized container with respect to the predetermined batch of sterilized containers being processed by the drug filling line.

22. The method according to claim 21, wherein the identifier is selected from a group consisting of a tag, a RFID, a 1D barcode, a 2D barcode, a QR code, an ink jet printing, a laser printing, a laser tattooing, or an engraving.

* * * * *